(12) United States Patent
James (10) Patent No.: US 6,530,009 B1
(45) Date of Patent: Mar. 4, 2003

(54) METHODS FOR INCREASING FILE STORAGE CAPACITY OF OPTICAL DISCS

(75) Inventor: Kenneth R. James, Sunnyvale, CA (US)

(73) Assignee: Roxio, Inc., Santa Clara, CA (US)

(*) Notice: Subject to any disclaimer, the term of this patent is extended or adjusted under 35 U.S.C. 154(b) by 0 days.

(21) Appl. No.: 09/524,050

(22) Filed: Mar. 13, 2000

(51) Int. Cl.⁷ .............................................. G06F 12/02
(52) U.S. Cl. ...................... 711/171; 711/112; 707/205; 369/275.3
(58) Field of Search ................................ 711/112, 171; 707/205; 369/275.3

(56) References Cited

U.S. PATENT DOCUMENTS

| | | |
|---|---|---|
| 6,058,091 A | 5/2000 | Yokota et al. |
| 6,091,686 A | 7/2000 | Caffarelli et al. |
| 6,118,737 A | 9/2000 | Hütter |
| 6,118,754 A | 9/2000 | Sako et al. |
| 6,141,489 A | 10/2000 | Honda |
| 6,243,340 B1 * | 6/2001 | Ito et al. .................. 358/909.1 |
| 6,353,173 B1 * | 3/2002 | D'Amato et al. ........ 369/275.3 |
| 6,446,073 B1 * | 9/2002 | D'Amato et al. ........... 707/101 |

* cited by examiner

Primary Examiner—Hiep T. Nguyen
(74) Attorney, Agent, or Firm—Martine & Penilla, LLP (57) ABSTRACT

Methods for organizing and recording data files on an optical disc that increases the file storage capacity of optical discs are provided. In one example, a method includes the operations of determining the length of a file system of data to be recorded and then writing a volume descriptor sequence for the session. The file system, or any portion of it that will fit is then recorded before logical block 75. A portion of the data files or file extents is recorded in any space that may remain after the file system and before block 75, and then the fixed location CD-Plus file is recorded in block 75. The remaining portion of the file system is recorded immediately following the CD-Plus file. In another example, a method includes the similar operations of determining the length of a file system of data to be recorded and then writing a volume descriptor sequence for the session, but then writes only the file system or any portion of the file system that fits before logical block 75. In yet another example, a method includes recording the file system after logical block 75, and recording any portion of the data files or file extents after the volume descriptor sequence and before logical block 75.

21 Claims, 8 Drawing Sheets

METHODS FOR INCREASING FILE STORAGE CAPACITY OF OPTICAL DISCS

BACKGROUND OF THE INVENTION

1. Field of the Invention

The present invention relates generally to the recording of data onto optical discs, and more particularly to a method for removing the limit on the number of data files that can be recorded on a CD-Plus multi-session optical disc.

2. Description of the Related Art

Optical disc storage of data offers relatively high capacity data storage (e.g., approximately 640 Megabytes) on a relatively small and inexpensive optical disc. Optical disc recording commonly involves recording (sometimes referred to as "burning") audio tracks or data files on one or more spiral tracks on a optical disc, which can typically hold between 1 and 99 tracks. A multi-session disc such as the CD-Plus accommodates both audio and data sessions on a single disc with one session allocated to audio information and one session to data files. In the data session, a volume descriptor sequence and a file system is typically recorded at the beginning of a session. The volume descriptor sequence contains a Primary Volume Descriptor (PVD), any number of Supplementary Volume Descriptors (SVD), and a Volume Descriptor Set Terminator (VDST).

The PVD and SVD describe the volume space, identify the attributes of the volume, identify the locations of a Root Directory, a group of Path Tables, and identify certain structures associated with the file system. The volume descriptor sequence must be terminated by a VDST. The file system, as the term is used herein, contains Path Tables and Directory Records. The file system is typically recorded immediately following the volume descriptor sequence and contains location and structure information for the directories and files such as directory hierarchy, structure, and location, file locations and logical block numbers. The volume descriptor sequence by convention (and in compliance with ISO standard 9660) is located in logical block 16 (and blocks following block 16 if needed) of the first track of a recording session. The ISO 9660 Specification (also referred to as the Information Processing-Volume and file structure of CD-ROM for information interchange) is hereby incorporated by reference.

When recording on an optical disc, data files are continuously recorded onto one or more tracks of the optical disc during a recording session. The data files to be recorded are scanned and a volume descriptor sequence and file system created. The volume descriptor sequence is then recorded starting in block 16, followed by the file system starting in the next available block following the VDST. In accordance with the Blue Book standard, block 75 is reserved for a fixed location CD-Plus file, and then data files are recorded beginning in block 76 or the next available block following the fixed location CD-Plus file. Blue Book (Compact Disc Digital Audio Enhanced Music CD Specification, Version 1.0, December 1995, and both earlier and later versions) is hereby incorporated by reference. The size of the file system is proportional to the number of data files selected for recording such that as the number of files selected for recording increases, so does the size of the file system. Eventually, after the number of data files reaches about 1700, the file system can no longer fit in the allocated space before the reserved block 75. If the number of data files to be recorded is greater than about 1700, only about 1700 data files will be recorded on any one optical disc. This limitation is a result of the space allocated for the file system and not the size of the data files. The optical disc may have the storage capacity for more data files, but the number of files that can be recorded is limited to only about 1700 data files.

Figure 1A:
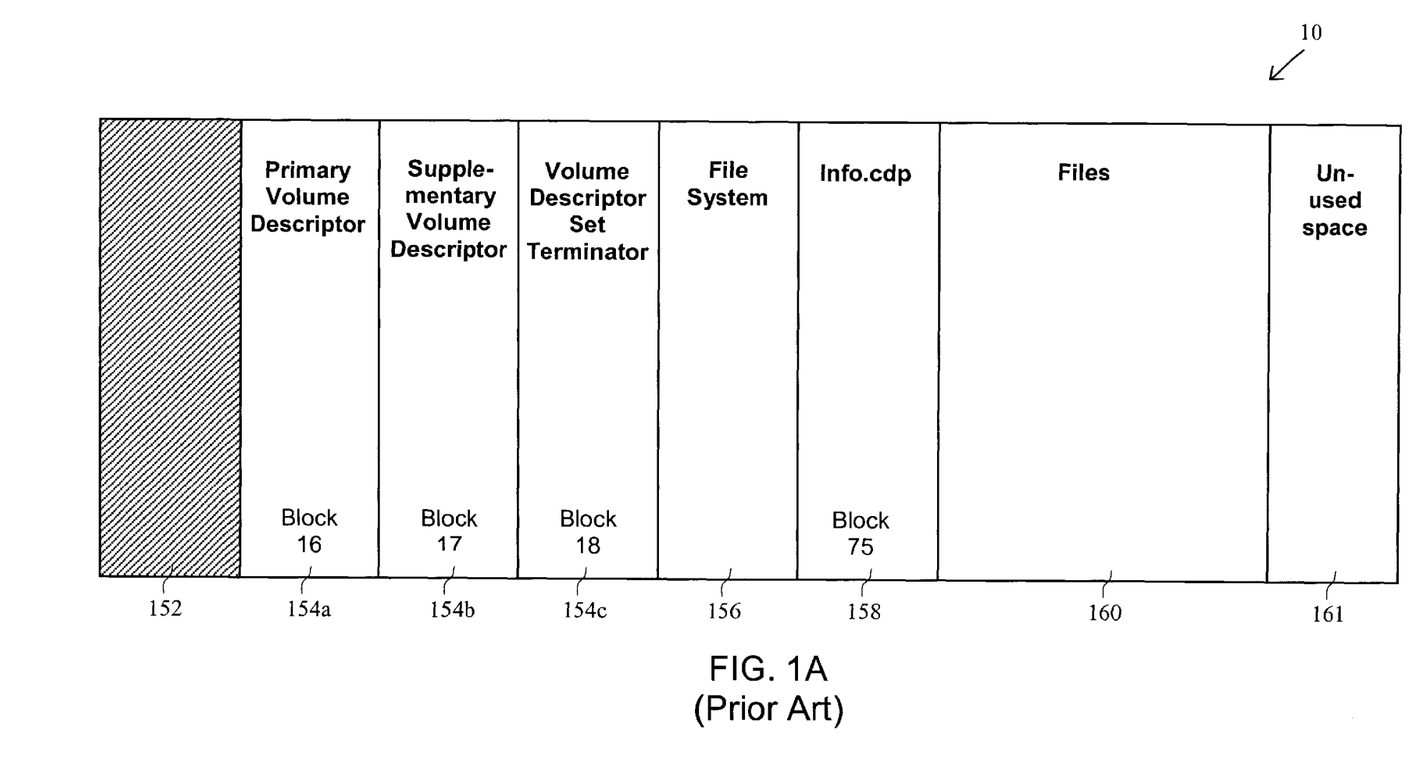
FIG. 1A shows a block diagram of the prior art allocation of information on a CD-Plus optical disc.

FIG. 1A shows a block diagram 10 of the prior art allocation of information on a CD-Plus optical disc. In accordance with the ISO 9660 standard, blocks 1 through 15 are reserved for system use and are represented as shaded area 152. The volume descriptor sequence is recorded beginning in block 16 with the PVD 154a, followed by the SVD 154b and the VDST 154b. The block diagram 10 is representative of a typical allocation, and the SVD 154b and VDST 154c shown in blocks 17 and 18 are not always or necessarily allocated to those two particular blocks. The PVD 154a, however, will always be recorded in block 16, and the SVD 154b and VDST 154c are recorded immediately following. The file system 156 is recorded in that area after the VDST and before block 75. As mentioned above, the size of the file system is directly proportional to the number of data files to be recorded. Thus, if only a few data files are selected to be recorded, regardless of the size of the files themselves, then a small file system is created and recorded in the space allocated to the file system 156. Nothing else is recorded in the space allocated to the file system 156, and so a small file system can result in space allocated for the file system 156 remaining unused.

However large or small the file system may be, an info.cdp file 158 is recorded at block 75. This is a fixed-location CD-Plus file that is recorded in block 75 in accordance with Blue Book and, as described above, is the primary limiting factor in the number of files that may be recorded on an optical disc due to this fixed location. Data files 160 are recorded in the blocks after block 75 info.cdp file 158 to the end of the disc, or until the maximum number of files, about 1700, are selected for recording. Because the size of the file system is proportional to the number of data files and not the size of the data files, the result illustrated in FIG. 1A is possible when the number of files selected for recording is about 1700, but the size of the files is smaller than the capacity of the optical disc. When this situation occurs, there is unused space 161 left on the disc after the data files 160 are recorded.

This limitation on the number of data files that can be recorded on a CD-Plus optical disc, therefore, results in wasted disc space and the need to use multiple discs and recording sessions to record the data. What is needed is a method for recording data on optical discs that is not limited by the number of files selected for recording. The method should be configured to avoid the problems of the prior art.

SUMMARY OF THE INVENTION

The present invention fills these needs by providing methods that can remove the limit on the number of files that can be recorded on a CD-Plus multi-session optical disc. The invention is a method for recording and organizing data on a CD-Plus multi-session optical disc in such a way as to allow for a file system that can be as large as it needs to be to accommodate the data selected for recording. The present invention can be implemented in numerous ways, including as a process, an apparatus, a system, a device, a method, or a computer readable media. Several embodiments of the present invention are described below.

In one embodiment, a method for recording data on a CD-Plus multi-session optical disc is disclosed. The method includes determining a length of a file system of data to be recorded and then recording a volume descriptor sequence (VDS). The file system or any portion of the file system that will fit is recorded in the space between the VDS and logical block 75, if the file system or any portion of the file system will fit in the space. If any data files or file extents will fit in the remaining space between the file system or portion of the file system and logical block 75, those data files or file extents are written in that space. The fixed location CD-Plus file is recorded in logical block 75, and then the remaining portion of the file system is written in the space beginning with the next logical block following the fixed location CD-Plus file in block 75.

In another embodiment, a method for recording data on an optical disc is disclosed. The length of the file system of data to be recorded is determined, and then the VDS is written. The file system or any portion of the file system that will fit is recorded in the space between the VDS and logical block 75, if the file system or any portion of the file system will fit in the space. That portion of the file system that fits before logical block 75 is written into that space. The fixed location CD-Plus file is recorded in logical block 75, and then the remaining portion of the file system is written in the space beginning with the next logical block following the fixed location CD-Plus file in block 75.

In yet another embodiment, a method for recording data on an optical disc is disclosed. In this embodiment data is written both before and after logical block 75. Accordingly, a length of the file system of data to be recorded is determined, and then the VDS is written. A portion of the data including data files and file extents is written into the space between the VDS and logical block 75. The fixed location CD-Plus file is recorded in logical block 75, and then the file system is written in the space beginning with the next logical block following the fixed location CD-Plus file in block 75.

One benefit and advantage of the present invention is that more efficient use can be made of the storage capacity of a CD-Plus multi-session optical disc if the session is no longer limited by the number of files that can be selected for recording. This benefit leads to the additional benefits of decreased cost of recording data if fewer discs are required to record data more efficiently, decreased time for recording if more data is recorded in fewer sessions, and decreased turn-around time for recording if fewer sessions are required.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for removing the limit on the number of data files that can be recorded on a CD-Plus multi-session optical disc is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1B:
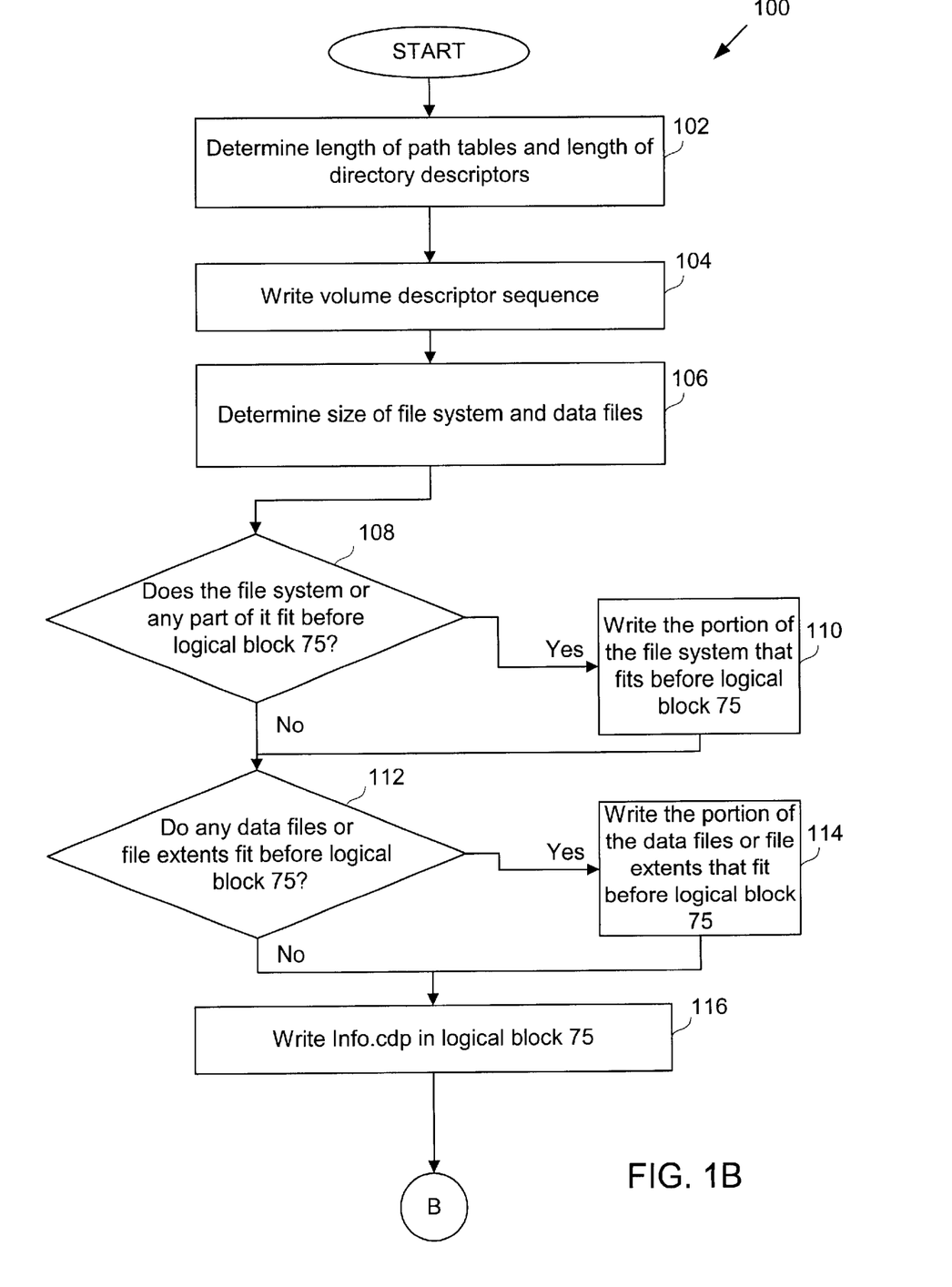
FIGS. 1B and 1C show a flowchart of a sequence of operations performed to record data onto a CD-Plus optical disc in accordance with one embodiment of the invention.
Figure 1C:
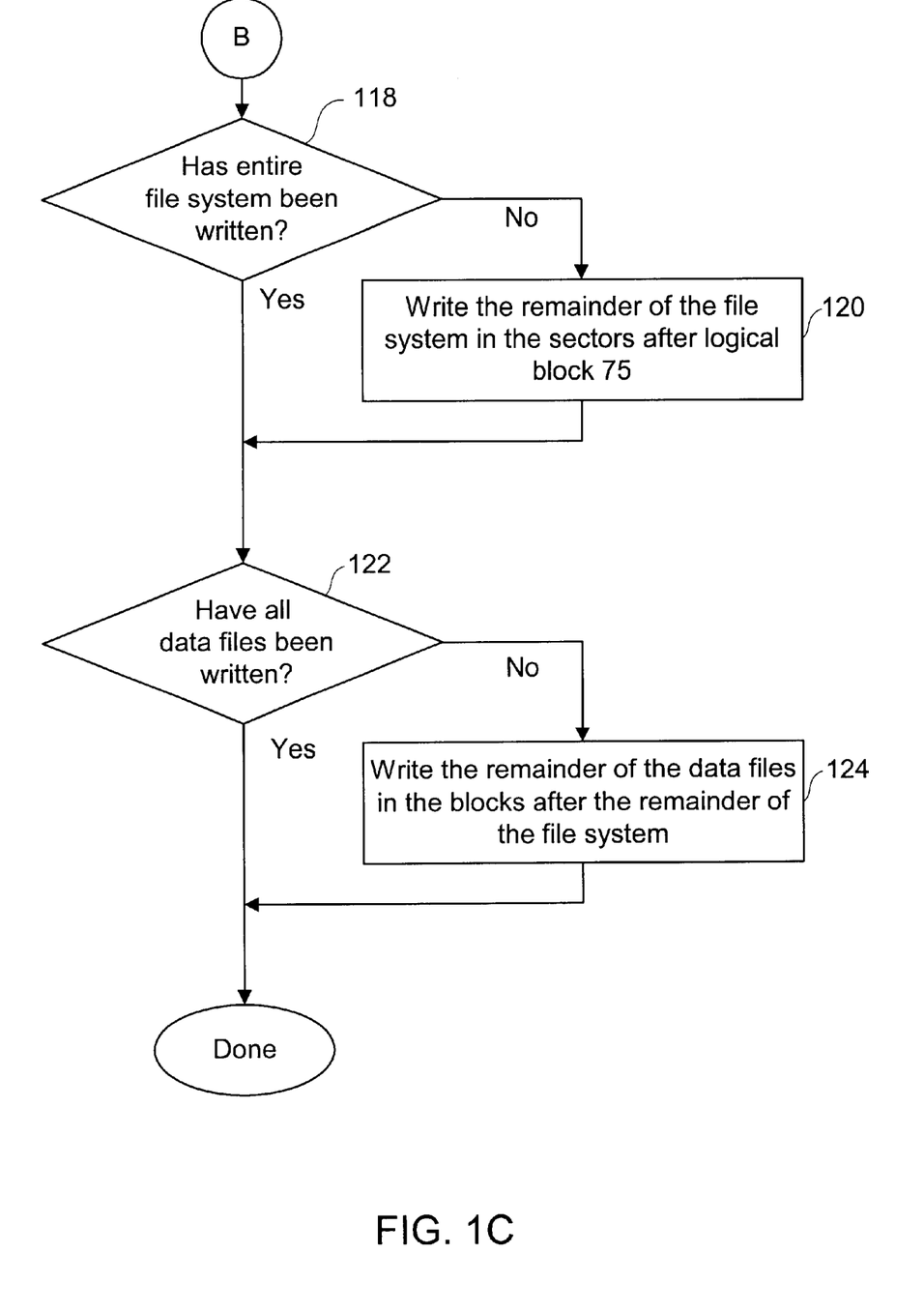

FIGS. 1B and 1C show a flowchart 100 of a sequence of operations performed to record data onto a CD-Plus optical disc in accordance with one embodiment of the invention. The method begins in FIG. 1B with operation 102 where the recording system determines the length of the path tables and the length of the directory descriptors. When data files have been selected for recording onto an optical disc, the recording software directs the system to scan the selected files to identify the directories, subdirectories, and files of the data to be recorded. The recording system determines the organization of the data so that it can then generate a data structure for the CD-Plus optical disc on which the data will be recorded. The path tables and the directory descriptors are the file system for the data that will be recorded and contain structure and location information so that each data file can be located on the optical disc. The path tables and directory descriptors identify root directories, subdirectories, and the data records, provide the locations of the directories, subdirectories, and data records, and provide other attributes of the directories, subdirectories, and data records as required. Before data is recorded onto an optical disc, the data must be scanned and an hierarchy and structure generated. The length of the path tables and the directory descriptors is directly proportional to the number of data records, files, subdirectories, and directories that organize the data that will be recorded.

The method continues with operation 104 where a Volume Descriptor Sequence (VDS) is written. The VDS includes the Primary Volume Descriptor (PVD), any Supplementary Volume Descriptors (SVD) that may be required depending on the size, length, and complexity of the structure of the data to be recorded, and the Volume Descriptor Set Terminator (VDST). The VDS describes the volume space, identifies the attributes of the volume, identifies the location of a root directory and a group of path tables, and identifies certain structures associated with the file system. The VDS is terminated by a VDST. In accordance with ISO 9660, the VDS is written beginning in block 16, and continues in consecutive subsequent blocks until the VDS is written and terminated by a VDST.

In a preferred embodiment of the present invention, the blocks between the VDST and block 75 will be filled with the file system and/or data. In order to maximize the use of these blocks, the method proceeds to operation 106 where the file system and the data files to be written are scanned to determine their size. Once the size of all of these files are determined, the system can allocate all or part of the file system and/or the data files to that space between the VDST and block 75. To do this, the method proceeds to the first decision block 108 and determining whether or not the file system or any part of it fits in the space before block 75. If the answer is yes, the file system, or whichever part of it fits, will be written in the logical blocks between the VDST and logical block 75 as shown in operation 110.

If the file system, or any part of it, does not fit before logical block 75, the method moves to a second decision block 112. The method also moves to this second decision block 112 immediately following the writing of the file system or any part of it that fits before logical block 75 in operation 110. Once the system has determined whether or not the file system or any part of it fits before logical block 75, and written any part of the file system that does fit in that space, the method next determines if any data files or data file extents fit into the remaining space before logical block 75. In a preferred embodiment of the present invention, the recording system will maximize the use of available space on a CD-Plus optical disc. Since, in accordance with the Blue Book standard, the info.cdp file is fixed to logical block 75, the method herein described seeks to maximize efficient use of logical sectors both before and after logical block 75.

As was described above, the prior art records only the file system in the blocks between the VDST and logical block 75, and can result in either unused and wasted space, or in limiting the number of files that can be recorded to about 1700. In the present invention, the method first determines if all or any one part of the file system can be recorded in the space before logical block 75, and then records that portion of the file system that fits, and then in decision block 112, the method seeks to determine if any data files or data file extents will fit before logical block 75. In order to make the determination called for, the recording system must know if any space remains before logical block 75, and how much space that may be. Then, because the method already determined the size of all of the data files to be recorded in operation 106, the system selects whichever files or file extents, if any, fit before block 75, and then writes the portion of the data files or file extents that fit before logical block 75 in operation 114.

If no data files or data file extents fit before logical block 75, the method proceeds to block 75 and writes the info.cdp file in that block in operation 116. The method also performs operation 116 after writing the data files or file extents of operation 114, if operation 114 was performed. As discussed above, the info. cdp file is a fixed location CD-Plus file that is written in logical block 75. The method then continues at B of FIG. 1C.

As shown in FIG. 1C, the method next determines whether or not the entire file system has been written in decision block 118. If not, the method proceeds to write the remainder of the file system in the sectors after logical block 75 in operation 120. If the entire file system had already been written, or after writing the remaining portion of the file system, the method next determines if all of the data files have been written in decision block 122. If all of the data files have been written, the method is done. If any data files remain, the remaining data files are written in operation 124, and the method is done.

Figure 1D:
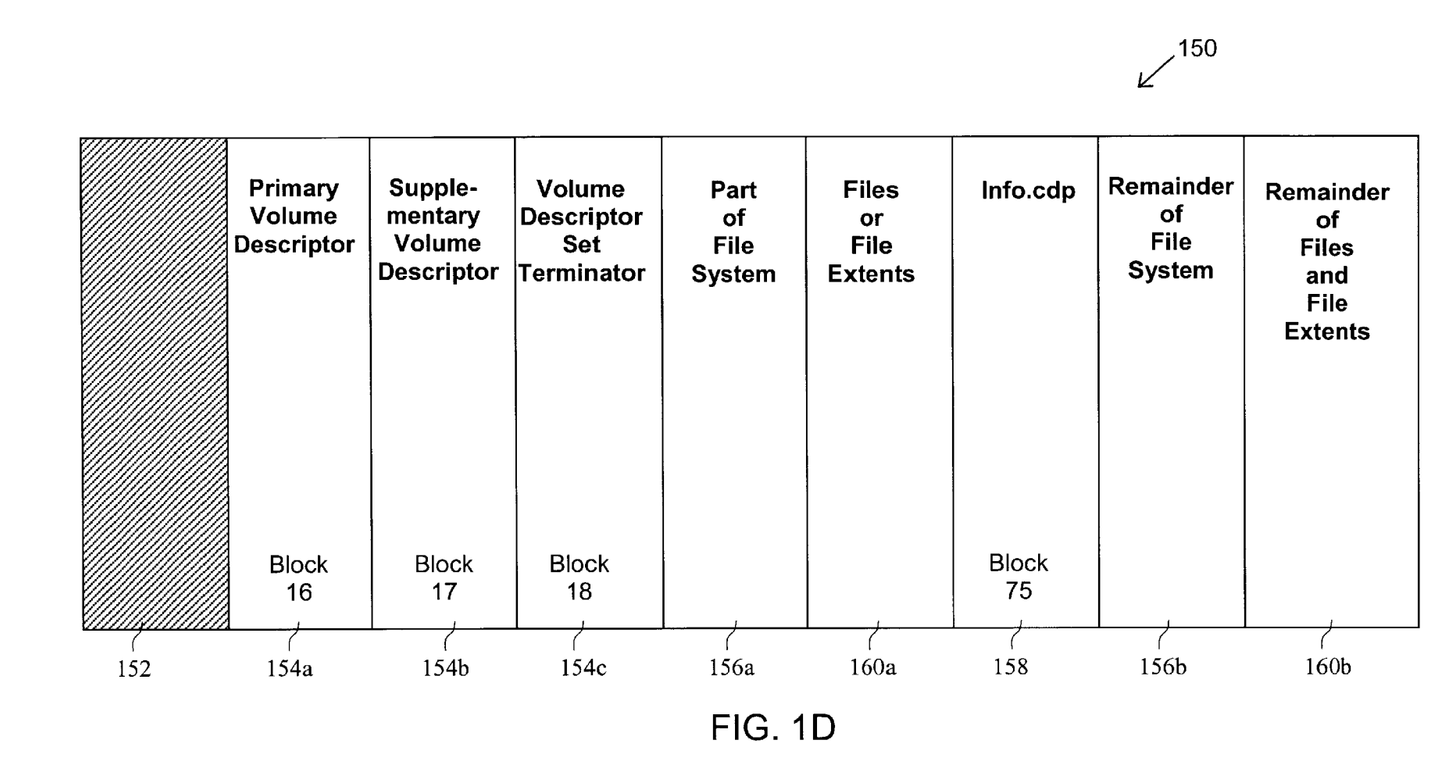
FIG. 1D shows a block diagram of the structure of a data session in accordance with one embodiment of the invention.

FIG. 1D shows a block diagram 150 of the resulting structure of a data session following the above method in accordance with one embodiment of the invention. Blocks 1–15 remain reserved for system use, and are shown as shaded area 152. The VDS is shown in blocks 16–18 with the PVD 154a in block 16, an SVD 154b in block 17, and the VDST 154c in block 18. All, or any part of the file system that fits, is shown at 156a in that space between the VDST and block 75. In accordance with a preferred embodiment, the space between the VDST and block 75 is used as completely as possible, and block diagram 150 represents this at 160a where any data files or file extents are written in that space following any part of the file system 156a that may have been written. The info.cdp file 158 is written in block 75. Any remaining part of the file system 156b is written after the info.cdp file, and the remaining data 160b is written to complete the session.

Figure 2A:
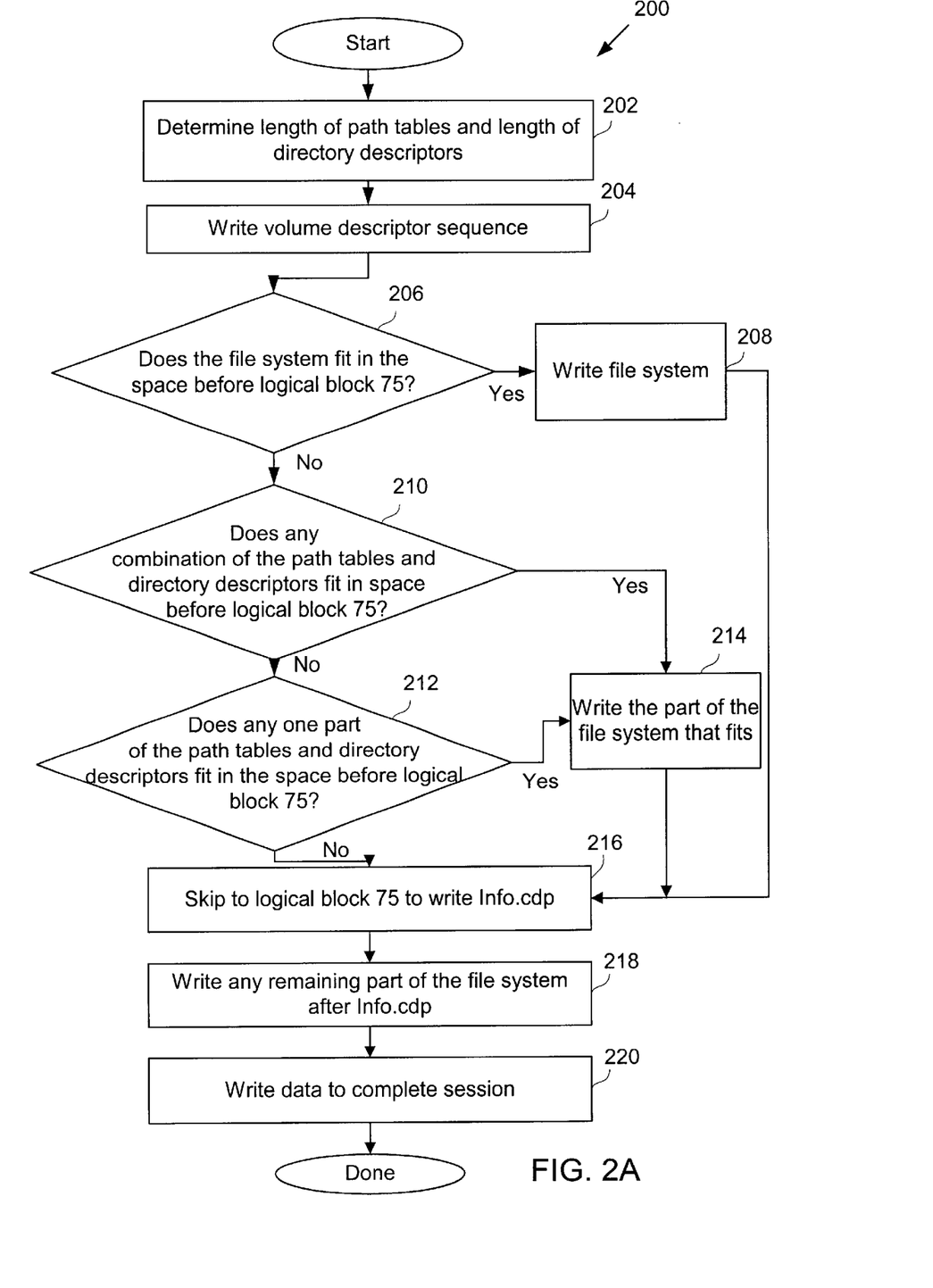
FIG. 2A shows a flowchart diagram illustrating the method operations performed in which data is recorded on a CD-Plus optical disc in accordance with another embodiment of the present invention.

FIG. 2A shows a flowchart diagram 200 illustrating the method operations performed in which data is recorded on a CD-Plus optical disc in accordance with another embodiment of the present invention. The method begins with operation 202 where the recording system determines the length of the path tables and the length of the directory descriptors. As discussed above, when data files have been selected for recording onto an optical disc, the recording software directs the system to scan the selected files to identify the directories, subdirectories, and files of the data to be recorded. The recording system determines the organization of the data so that it can then generate a data structure for the CD-Plus optical disc on which the data will be recorded. The method then writes the VDS in operation 204. As above, the VDS includes the PVD, any SVD that may be required depending on the size, length, and complexity of the structure of the data to be recorded, and the VDST. The VDS describes the volume space, identifies the attributes of the volume, identifies the location of a root directory and a group of path tables, and identifies certain structures associated with the file system. The VDS is terminated by a VDST. In accordance with ISO 9660, the VDS is written beginning in block 16, and continues in consecutive subsequent blocks until the VDS is written and terminated by a VDST.

The method next advances to decision block 206 where it is determined whether or not the file system will fit in the space between the VDST and logical block 75. If the file system will fit in that space, the method proceeds to operation 208 and writing the file system in that space. Once the file system is written, the method proceeds to operation 216 and to logical block 75 to write the info.cdp file. If, however, it was determined at decision block 206 that the file system could not fit into the space between the VDST and block 75, the method proceeds to another decision block 210 and determines whether any combination of path tables and directory descriptors fit in the space before logical block 75. As discussed above, the file system includes the path tables and the directory descriptors. In accordance with ISO 9660, the path tables consist of Type L path tables and Type M path tables.

Decision block 210 is directed at determining if any combination of type L path tables, type M path tables and directory descriptors will fit in the space between the VDST and block 75. If any combination of the type L path tables, type M path tables, and directory descriptors will fit in the space before logical block 75, the method calls for operation 214 and writing that combination of type L path tables, type M path tables, and directory descriptors in the space before logical block 75. Once the files are written in operation 214, the method goes to operation 216 and writing info. cdp in logical block 75.

If no combination of path tables and directory descriptors fits in the space between the VDST and logical block 75, then the method advances to yet another decision block 212. In decision block 212, the system determines if any one part of the path tables and directory descriptors fit in the space before logical block 75. If no combination of path tables and directory descriptors can fit into the space before block 75, then decision block 212 determines if any one part of the file system can be written before block 75. If it is determined that a part can be written, then the method proceeds to operation 214 and writes that part of the file system that will fit. Once the part of the file system is written, then the method goes to logical block 75 in operation 216 and writes the info.cdp file. The method also goes to operation 216 if no one part of the file system will fit in the space before logical block 75. That is to say, the method looks to all and then any combination or part of the file system to write into the space between the VDST and logical block 75. If it determines that all or part of the file system will fit in the space, then that portion that will fit is written. If, however, no part of the file system fits, then the method goes to operation 216 and skips to logical block 75 to write the info.cdp file.

After the info.cdp file is written in logical block 75, the method advances to operation 218 and writes the remaining portion, if any, of the file system in the blocks immediately following block 75. The method then proceeds to operation 220 and writes the data to complete the session and the method of this embodiment is done.

Figure 2B:
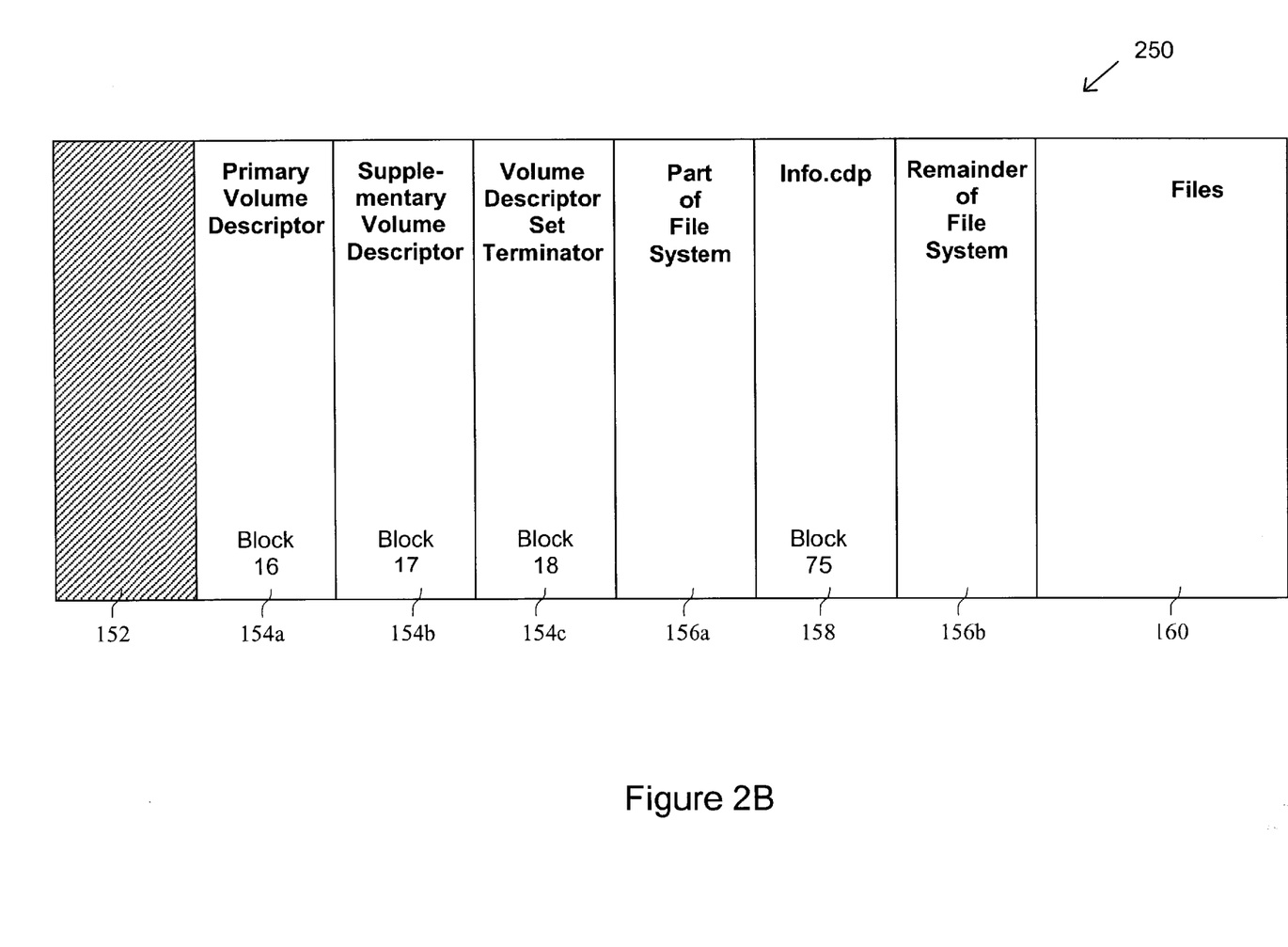
FIG. 2B shows a block diagram of the structure of a data session in accordance with another embodiment of the invention.

FIG. 2B shows a block diagram 250 of the resulting structure of a data session following the above method 200 in accordance with one embodiment of the invention. Blocks 1–15 remain reserved for system use, and are shown as shaded area 152. The VDS is shown in blocks 16–18 with the PVD 154a in block 16, an SVD 154b in block 17, and the VDST 154c in block 18. All, or any part of the file system that fits, is shown at 156a in that space between the VDST and block 75. The info.cdp file 158 is written in block 75. Any remaining part of the file system 156b is written after the info.cdp file, and the data files 160 are then written to complete the session.

Figure 3A:
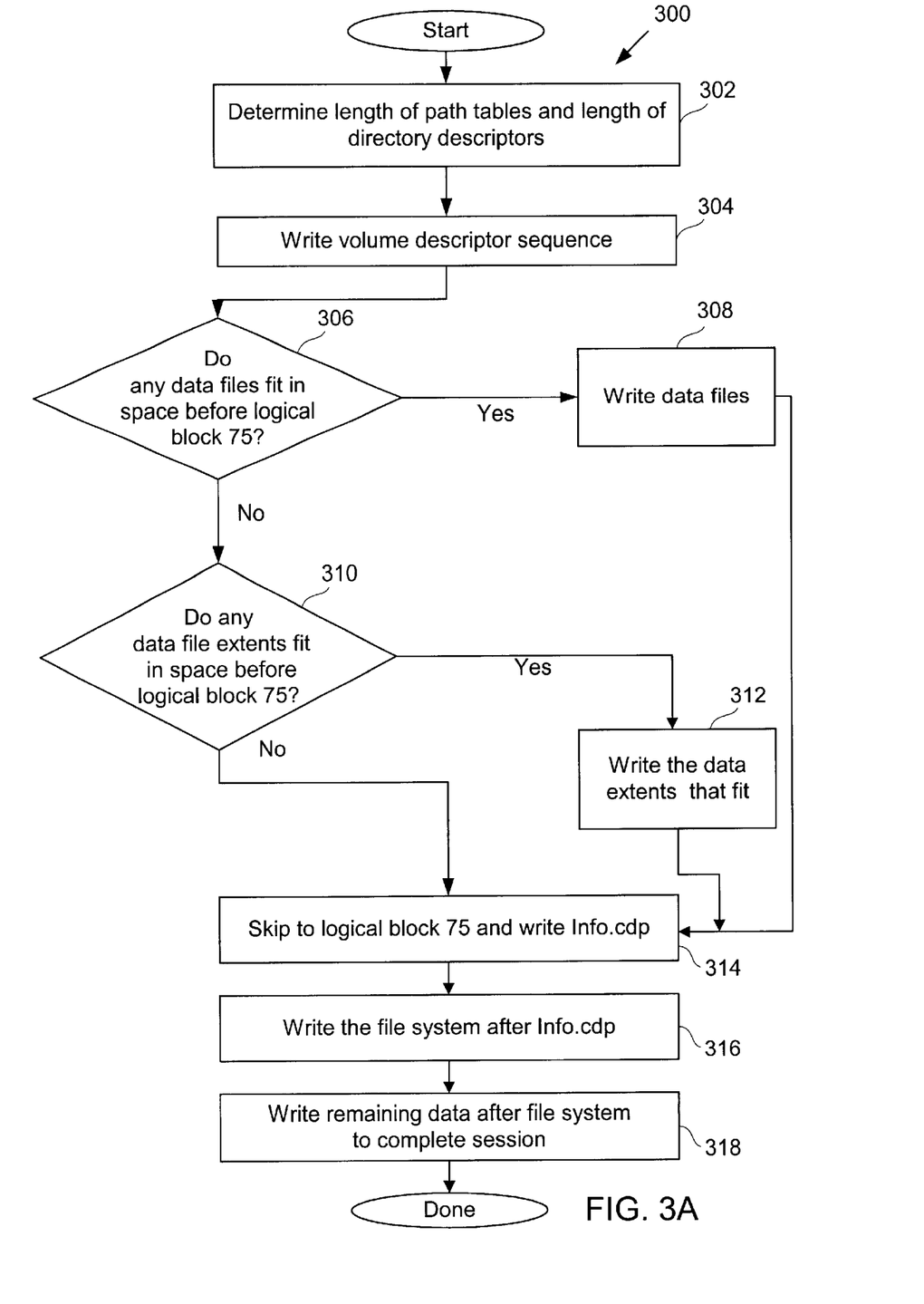
FIG. 3A shows a flowchart diagram illustrating the method operations performed in which data is recorded on a CD-Plus optical disc in accordance with yet another embodiment of the invention.

FIG. 3A shows a flowchart diagram 300 illustrating the method operations performed in which data is recorded on a CD-Plus optical disc in accordance with yet another embodiment of the invention. The method is similar to the embodiment described in flowchart diagram 200, but as will be described in greater detail below, this embodiment writes the file system immediately following the info.cdp file that is written in block 75, and uses the space between the VDST and block 75 for writing any data files or file extents that may fit.

The method begins with operation 302 where the recording system determines the length of the path tables and the length of the directory descriptors. As discussed in flowcharts 100 and 200 above, when data files have been selected for recording onto an optical disc, the recording software directs the system to scan the selected files to identify the directories, subdirectories, and files of the data to be recorded. The recording system determines the organization of the data so that it can then generate a data structure for the CD-Plus optical disc on which the data will be recorded. The method then writes the VDS in operation 304. As above, the VDS includes the PVD, any SVD that may be required depending on the size, length, and complexity of the structure of the data to be recorded, and the VDST. The VDS describes the volume space, identifies the attributes of the volume, identifies the location of a root directory and a group of path tables, and identifies certain structures associated with the file system. The VDS is terminated by a VDST. In accordance with ISO 9660, the VDS is written beginning with block 16, and continues in consecutive subsequent blocks until the VDS is written and terminated by a VDST.

The method then advances to decision block 306 where it is determined whether or not any data files will fit in the space between the VDST and logical block 75. If any data files will fit in that space, the method proceeds to operation 308 and writing the data files in that space. Once the those data files that will fit are written, the method proceeds to operation 314 and to logical block 75 to write the info.cdp file. If, however, it was determined at decision block 306 that no data files would fit into the space between the VDST and block 75, the method proceeds to another decision block 310 and determines whether any data file extents will fit in the space before logical block 75. In accordance with ISO 9660, an extent is a set of logical blocks in continuous ascending sequence. Data file extents are not complete data files, but parts of files that fill logical blocks. If the data file is of a type that can be broken into file extents, the method determines in decision block 310 whether or not the data files contain extents and where such extents may fit, if at all, in the space between the VDST and logical block 75. If it is determined that the data can be fragmented into data file extents, and any extents will fit in the space between the VDST and logical block 75, the method proceeds to operation 312 and writes those extents. The method then skips to logical block 75 and writes the info.cdp file in operation 314. If the data files cannot be fragmented into extents, or the extents will not fit in the space between the VDST and logical block 75, the method skips to logical block 75 and writes the info.cdp file in operation 314.

After the info.cdp file is written in logical block 75, the method advances to operation 316 and writes the file system in the blocks immediately following block 75. Although in this embodiment the file system or some part of it does not immediately follow the VDS, the file system still includes the path tables and the directory descriptors for the data that will be recorded and contains structure and location information so that each data file can be located on the optical disc. The path tables and directory descriptors identify root directories, subdirectories, and the data records, provide the locations of the directories, subdirectories, and data records, and provide other attributes of the directories, subdirectories, and data records as required. The method then proceeds to operation 318 and writes the remaining data to complete the session and the method is done.

Figure 3B:
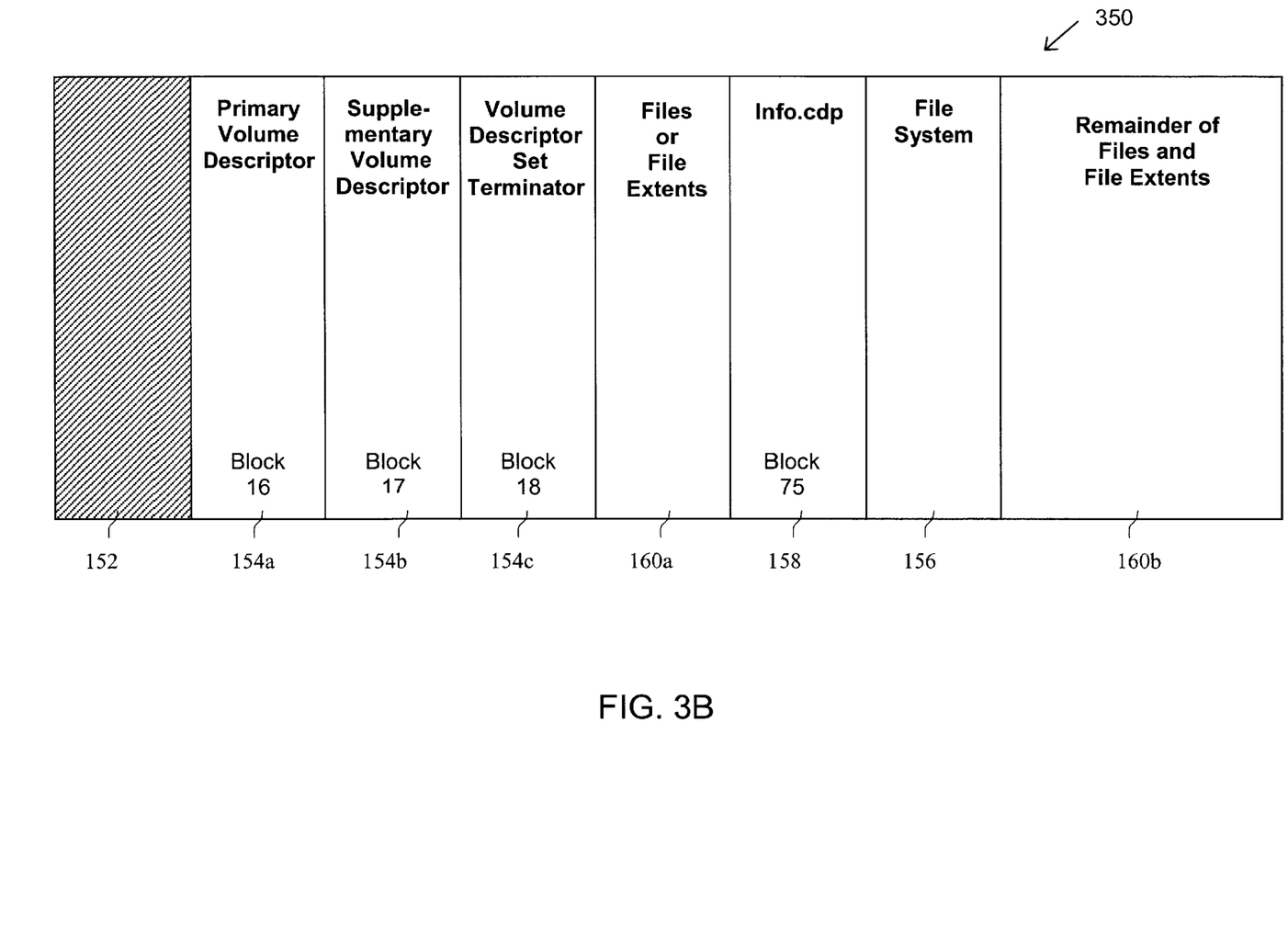
FIG. 3B shows a block diagram of the structure of a data session in accordance with yet another embodiment of the invention.

FIG. 3B shows a block diagram 350 of the resulting structure of a data session following the above method 300 in accordance with one embodiment of the invention. Blocks 1–15 remain reserved for system use, and are shown as shaded area 152. The VDS is shown in blocks 16–18 with the PVD 154a in block 16, an SVD 154b in block 17, and the VDST 154c in block 18. The data files or file extents are shown at 160a in the space between the VDST and block 75. The info.cdp file 158 is written in block 75. The file system 156 is written after the info.cdp file, and all remaining data 160b are then written to complete the session.

One benefit and advantage of the invention is more efficient use of the capacity of the CD-Plus multi-session optical disc. Another benefit is faster turn around time for burning large amounts of data to a CD-Plus optical disc by requiring fewer discs and fewer recording sessions. An additional benefit is the reduction in cost by reducing the number of discs required for the same amount of data over that required using prior art techniques.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

The exemplary embodiments described herein are for purposes of illustration and are not intended to be limiting. Accordingly, those skilled in the art will recognize that the present embodiments are to be considered as illustrative and not restrictive, and the invention is not to be limited to the details given herein, but may be modified within the scope and equivalents of the appended claims.

What is claimed is:

1. A method for recording data on an optical disc, comprising:
   determining a length of a file system of data to be recorded;
   writing a volume descriptor sequence;
   writing a first portion of the file system between the volume descriptor sequence and a logical block 75 if the first portion fits before the logical block 75;
   writing a first portion of one or both of data files and file extents before logical block 75 if the first portion fits before the logical block 75;
   writing a fixed location CD-Plus file in the logical block 75; and
   writing a second portion of the file system beginning in a next logical block following logical block 75 containing the fixed location CD-Plus file.

2. A method for recording data on an optical disc as recited in claim 1, wherein the volume descriptor sequence includes a primary volume descriptor and a volume descriptor set terminator.

3. A method for recording data on an optical disc as recited in claim 1, wherein the volume descriptor sequence includes a supplementary volume descriptor.

4. A method for recording data on an optical disc as recited in claim 1, wherein the volume descriptor sequence describes a volume space, identifies attributes of a volume, and identifies locations on the volume of a root directory and a group of path tables.

5. A method for recording data on an optical disc as recited in claim 1, wherein the file system includes path tables and directory records of data on a volume.

6. A method for recording data on an optical disc as recited in claim 1, further comprising:
   writing a second portion of one or both of data files and file extents beginning in a next logical block following a last logical block containing any data that is the second portion of the file system.

7. A method for recording data on an optical disc as recited in claim 1, wherein the fixed location CD-Plus file is an info.cdp file.

8. A method for recording data on an optical disc, comprising:
   determining a length of a file system of data to be recorded;
   writing a volume descriptor sequence;
   writing a first portion of the file system between the volume descriptor sequence and a logical block 75 if the first portion fits before the logical block 75;
   writing a fixed location CD-Plus file in the logical block 75; and
   writing a second portion of the file system beginning in a next logical block following logical block 75 containing the fixed location CD-Plus file.

9. A method for recording data on cn optical disc as recited in claim 8, wherein the volume descriptor sequence includes a primary volume descriptor and a volume descriptor set terminator.

10. A method for recording data on an optical disc as recited in claim 8, wherein the volume descriptor sequence may include a supplementary volume descriptor.

11. A method for recording data on an optical disc as recited in claim 8, wherein the volume descriptor sequence describes a volume space identifies attributes of the volume, identifies locations on the volume of a root directory and a group of path tables.

12. A method for recording data on an optical disc as recited in claim 8, wherein the file system includes path tables and directory records of data on a volume.

13. A method for recording data on an optical disc as recited in claim 8, further comprising:
   writing data files and file extents beginning in a next logical block following a last logical block containing any data that is the second portion of the file system.

14. A method for recording data on an optical disc as recited in claim 8, wherein the fixed location CD-Plus file is an info.cdp file.

15. A method for recording data on an optical disc, comprising:
   determining a length of a file system of data to be recorded;
   writing a volume descriptor sequence;
   writing a first portion of one or both of data files and file extents before logical block 75 if the first portion fits before the logical block 75;
   writing a fixed location CD-Plus file in the logical block 75, and
   writing a file system beginning in a next logical block following logical block 75 containing the fixed location CD-Plus file.

16. A method for recording data on an optical disc as recited in claim 15, wherein the volume descriptor sequence includes a primary volume descriptor and a volume descriptor set terminator.

17. A method for recording data on an optical disc as recited in claim 15, wherein the volume descriptor sequence may include a supplementary volume descriptor.

18. A method for recording data on an optical disc as recited in claim 15, wherein the volume descriptor sequence describes a volume space, identifies attributes of the volume, and identifies locations on the volume of a root directory and a group of path tables.

19. A method for recording data on an optical disc as recited in claim 15, wherein the file system includes path tables and directory records of data on a volume.

20. A method for recording data on an optical disc as recited in claim 15, further comprising:
    writing a second portion of one or both of data files and file extents beginning in a next logical block following a last logical block containing any data that is the file system.

21. A method for recording data on an optical disc as recited in claim 15, wherein the fixed location CD-Plus file is an info.cdp file.

* * * * *